Figure 1:
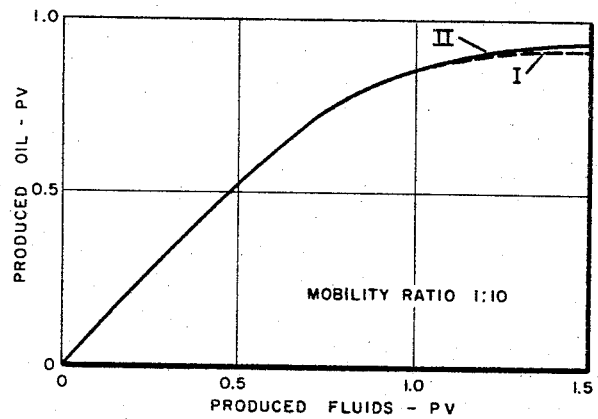

Aug. 1, 1967   R. A. GREENKORN   3,333,633
METHOD FOR INJECTING FLUIDS IN SECONDARY RECOVERY
Filed March 16, 1964   2 Sheets-Sheet 1

Robert A. Greenkorn
INVENTOR.

BY Gary C. Honeycutt
ATTORNEY

Robert A. Greenkorn
INVENTOR.

United States Patent Office 3,333,633
Patented Aug. 1, 1967

3,333,633
METHOD FOR INJECTING FLUIDS IN SECONDARY RECOVERY
Robert A. Greenkorn, Wauwatosa, Wis., assignor, by mesne assignments, to Esso Production Company, a corporation of Delaware
Filed Mar. 16, 1964, Ser. No. 352,007
4 Claims. (Cl. 166—9)

This invention relates to the recovery of oil from subsurface reservoirs. More particularly the invention is concerned with a method for improving the displacement efficiency obtained in oilfield "pattern floods." Specifically, the volumetric fluid input rate into each fractional portion of a well pattern is maintained proportional to the product of the average permeability and the pore volume of that portion of the pattern.

The most widely practiced method for the secondary recovery of oil is waterflooding. In a pattern waterflood the wells to be used for water injection are spaced between producing wells in a regular pattern. The injection of water into alternate wells forces oil toward the wellbores of adjacent producers where it is lifted to the surface. If a reservoir matrix has uniform permeability, porosity and thickness, an equal rate of injection into each input well will produce an efficient displacement of reservoir oil. That is, the flood front surrounding each injection well will advance at an equal rate toward each adjacent production well. Moreover, a balanced pressure distribution will be obtained. Ultimately therefore, oil is uniformly displaced from the entire pattern.

If the matrix has uniform permeability, but differs in porosity and thickness from place to place within the reservoir, then the rate of injection into each portion of the well pattern must be adjusted to compensate for differences in pore volume. In such a case, efficient displacement of oil can be obtained by maintaining the volumetric rate of fluid injection into each portion of the well pattern proportional to its pore volume. As before, a "balanced" flood is thus obtained, both from the standpoint of pressure distribution and from the standpoint of equal rates of frontal advance toward each production well.

However, it is well known that variations in both the permeability and the pore volume exist throughout naturally occurring reservoirs. Despite this knowledge, most field operations currently take into account only the variations in pore volume, while ignoring variations in permeability. Some operators, on the other hand, simply place all injection wells on a common header, thus providing each injection wellhead with the same pressure. If we assume equal sand-face depth at each injection well, and also assume equal wellbore damage or improvement for each injection well, then equal pressure at each well inherently causes each well to accept the flood medium at a rate proportional to matrix transmissibility at the well; but not proportional to average transmissibility, or average permeability, for any significant areal extent of the pattern.

Accordingly, it is an object of the present invention to obtain improved displacement efficiency for pattern floods, with an injection procedure which takes into account variations in both the permeability and the pore volume of the reservoir. Where both permeability and pore volume variations occur, it is usually impossible to maintain both a balanced pressure distribution and equal rates of frontal advance toward each of the adjacent production wells. The prior practice of injecting fluid at a rate proportional to pore volume along represents an attempt to provide equal rates of frontal advance, without regard for pressure distribution. Conversely, the present invention is based on the discovery that a more efficient displacement is obtained by providing a balanced pressure distribution, without regard for rates of frontal advance.

The method is applicable not only in waterflooding, but also in other forms of secondary recovery by pattern flooding, for example, in miscible displacement by solvent flooding, and in various thermal floods, such as steam flooding and in situ combustion.

The pattern most commonly employed for waterflooding and for other displacement processes is the "five-spot," which involves linear rows of producing wells alternating with offset-rows of injection wells. Each production well is thus surrounded by four equidistant injection wells located at the corners of a square. Conversely, each injection well is surrounded by four equidistant production wells located at the corners of a square pattern. Although the method of the invention is generally applicable to all well patterns, the remainder of the present disclosure will treat the five-spot only.

In practicing the present invention, a balanced pressure distribution is obtained by maintaining a volumetric rate of fluid injection into each quadrant of a five-spot pattern, in accordance with the following equation:

$$q_i = \frac{[(kh)(\phi A)]_i}{\sum_{j=1}^{4}[(kh)(\phi A)]_j} q_p \quad i=1, 2, 3, 4$$

where $q_i$ is the injection rate into a given quadrant, $q_p$ is the withdrawal rate from the production well, $k$ is the average quadrant permeability, $h$ is the average quadrant thickness, $\phi$ is the average quadrant porosity, and $A$ is the quadrant area. The four quadrants of a given five-spot are designated $j=1, 2, 3, 4$.

Each input well is shared by four adjoining five-spot patterns. Accordingly, the total injection rate at a given input well is determined by the sum of the rates required for each of the four quadrants receiving fluid from the given well, as calculated from the above equation.

Figure 2:
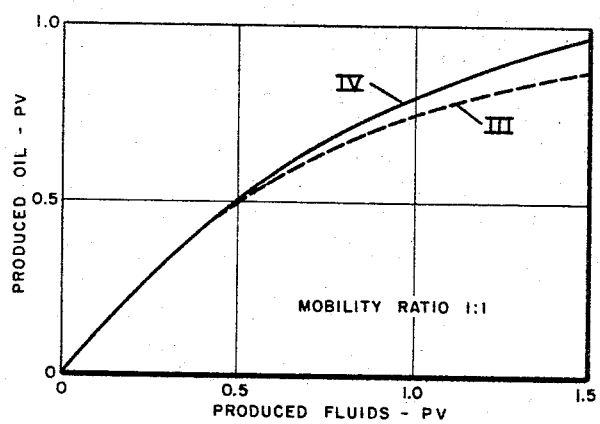
Figure 3:
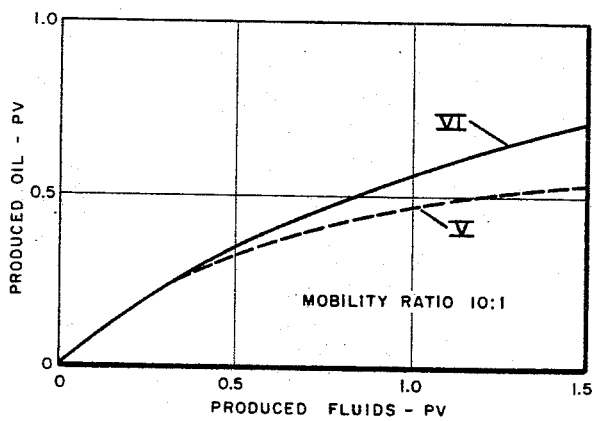

FIGURES 1–3 present the results of laboratory-scale flooding operations conducted with a three-dimensional, sand-packed reservoir model.

Figure 4:
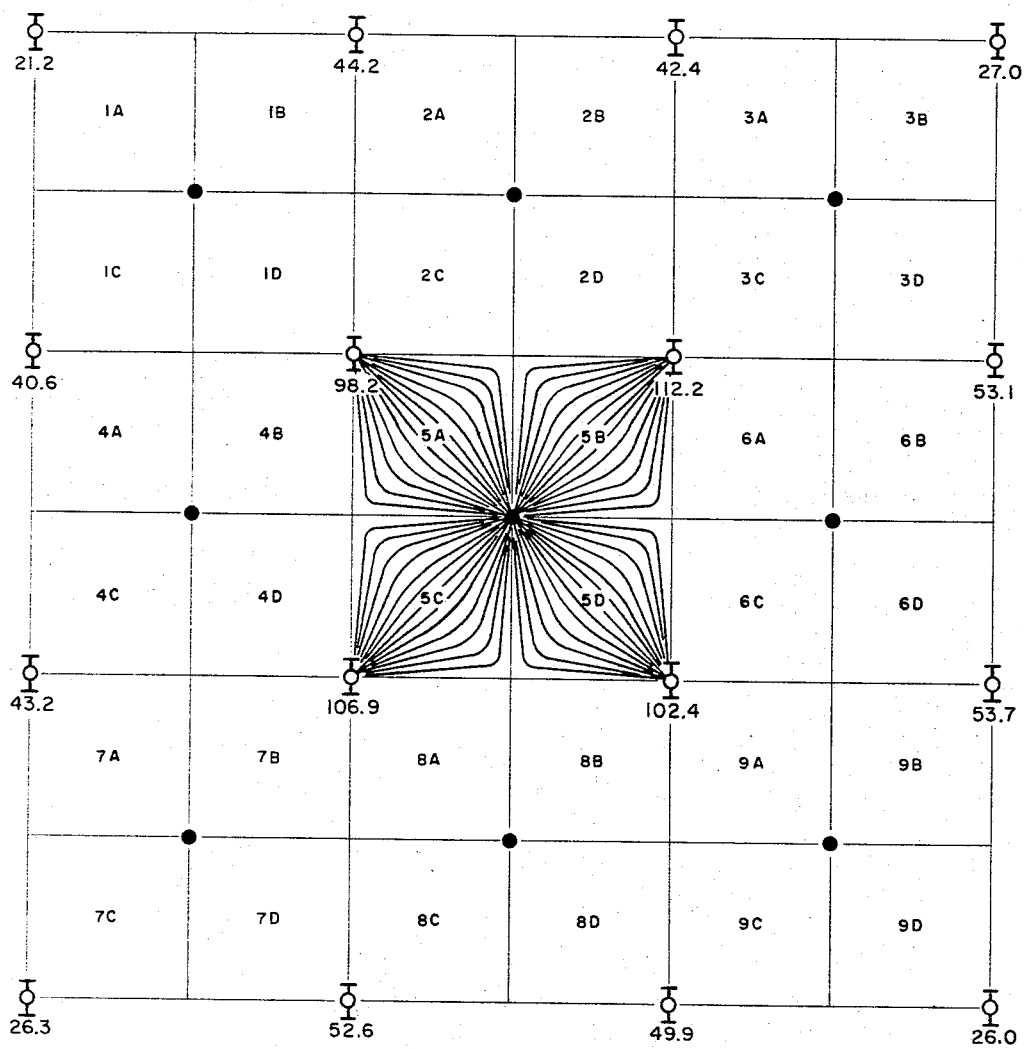

FIGURE 4 illustrates a specific embodiment of the invention.

FIGURE 1 presents a comparison of recovery curves obtained by displacing oil from a reservoir five-spot model, first by maintaining injection rates proportional to pore volume alone (I), and then in accordance with the injection procedure of the present invention (II). In this comparison the mobility ratio between the driving fluid and the driven fluid was 1:10. This ratio will be recognized by those skilled in the art as very favorable. That is, a low mobility ratio favors maximum displacement efficiency. By comparing curve I with curve II, it is apparent that slightly increased recovery due to the present invention is obtained after 1.0 pore volume of total fluids production.

FIGURE 2 shows a comparison of recovery curves in which oil was displaced from the reservoir five-spot model, first by maintaining injection rates proportional to pore volume alone (III), and then in accordance with the injection procedure of the present invention (IV). In this comparison the mobility ratio between the displacing fluid and the displaced fluid was 1:1, which is approximately representative of the majority of conventional waterfloods. In this case the increased displacement efficiency becomes apparent after about 0.5 pore volume of production (oil plus water).

FIGURE 3 shows a comparison of recovery curves in which oil was displaced from a reservoir five-spot model, first by maintaining injection rates proportional to pore volume alone (V), and then in accordance with the injection procedure of the present invention (VI). In this comparison the mobility ratio between driving fluid and driven fluid was 10:1, which is representative of solvent floods, for example, liquid propane, LPG, or isopropanol. This mobility ratio is highly unfavorable, a fact which has been generally recognized as contributing to the very poor displacement efficiency usually observed for such floods. The increased recovery attributable to the present invention, however, is greatest in the case of an unfavorable mobility ratio.

FIGURE 4 shows a hypothetical oil field having uniform thickness, and wherein five-spot well spacing is employed. It is assumed that 100 bbls. per day total production is to be withdrawn from each of the nine production wells. The corresponding injection rates (bbls. per day) required at each input well are indicated in accordance with a specific embodiment of the present invention. The indicated injection rates at the perimeter wells reflect the requirements of only the five-spot patterns shown in full. It is to be understood that in practice the requirements of adjacent patterns, not shown, would be added to the indicated rates.

The four quadrants of the first pattern (upper left-hand corner) are designated 1A, 1B, 1C and 1D, and the quadrants of the remaining eight patterns are similarly designated. The average permeability ($k$) in millidarcies and the average porosity ($\phi$) for each of the quadrants, including the respective products ($k\phi$), are listed below:

| $q_i$ | $k$ | $\phi$ | $k\phi$ | $q_i$ | $k$ | $\phi$ | $k\phi$ |
|---|---|---|---|---|---|---|---|
| 1A | 70 | .20 | 14.0 | 5C | 250 | .19 | 47.5 |
| 1B | 80 | .21 | 16.8 | 5D | 250 | .20 | 50.0 |
| 1C | 80 | .19 | 15.2 | 6A | 260 | .22 | 57.2 |
| 1D | 100 | .20 | 20.0 | 6B | 260 | .23 | 59.8 |
| 2A | 100 | .22 | 22.0 | 6C | 280 | .21 | 58.8 |
| 2B | 120 | .23 | 27.6 | 6D | 300 | .22 | 66.0 |
| 2C | 130 | .21 | 27.3 | 7A | 200 | .16 | 32.0 |
| 2D | 180 | .22 | 39.6 | 7B | 240 | .17 | 40.8 |
| 3A | 160 | .24 | 38.4 | 7C | 280 | .15 | 42.0 |
| 3B | 220 | .25 | 55.0 | 7D | 280 | .16 | 44.8 |
| 3C | 230 | .23 | 52.9 | 8A | 260 | .18 | 46.8 |
| 3D | 240 | .24 | 57.6 | 8B | 300 | .19 | 57.0 |
| 4A | 100 | .18 | 18.0 | 8C | 300 | .17 | 51.0 |
| 4B | 140 | .19 | 26.6 | 8D | 300 | .18 | 54.0 |
| 4C | 140 | .17 | 23.8 | 9A | 330 | .20 | 66.0 |
| 4D | 190 | .18 | 34.2 | 9B | 350 | .21 | 73.5 |
| 5A | 170 | .20 | 34.0 | 9C | 350 | .19 | 66.5 |
| 5B | 250 | .21 | 52.5 | 9D | 360 | .20 | 72.0 |

The flow rates indicated in FIGURE 4 for each injection well are calculated by substituting the values of $k\phi$ in the above equation. For example, the injection rate required for quadrant 5A is 3400/184 bbls. per day. The injection rate required for quadrant 5B is 5250/184 bbls. per day. The injection required for quadrant 5C is 4750/184 bbls. per day, and the requirement for quadrant 5D is 5000/184 bbls. per day. The numerator in each instance is the product $k\phi \times q_p$ (=100 bbls. per day). The denominator in each instance is the sum of $k\phi$ for all four quadrants of the given five-spot. Of course, the injection well of quadrant 5A, for example, is shared by quadrants 1D, 2C, and 4B of the surrounding five-spot patterns. Accordingly, the indicated injection rate of 98.2 bbls. per day is the sum of the injection rates separately calculated for each of quadrants 1D, 2C, 4B, and 5A. In making these calculations, the terms $h$ and $A$ of the equation cancel out, since they are constant for each term of the denominator and for the numerator. The hypothetical field is assumed to have uniform thickness; and each quadrant has the same area.

Flow streamlines are shown in FIGURE 4 for each quadrant of the center five-spot pattern. Streamlines for the remaining patterns, not shown, are essentially the same as indicated for the center pattern. It is especially significant that the streamlines for any given quadrant are wholly confined within the boundaries of the given quadrant. Stated otherwise, it becomes clear that the migration of fluids across quadrant boundaries is minimized in accordance with the present invention.

Since the rates of frontal advance in the various quadrants are generally unequal, it naturally follows that in a given five-spot pattern the quadrant having the highest permeability-pore volume product will be depleted first. Consequently, during the late stages of a flooding operation the flood medium which flows through a depleted quadrant serves only to maintain a balanced pressure distribution. Thus, it may seem inefficient to continue pumping water through a watered-out quadrant. However, the flood pattern obviously cannot be shut in one quadrant at a time. Therefore, it becomes critical from an economic point of view to compare the total volume of flood medium injected with the volume of oil produced from the whole pattern, at any given point in time. In essence, this is the information shown in FIGURES 1–3, since the volume of produced fluids (oil plus water) equals the volume of flood medium injected, at all times. The conclusion is therefore apparent that the advantage obtained from maintenance of a balanced pressure distribution more than outweighs the seeming disadvantage of pumping water through a watered-out quadrant.

The flooding of a pattern is terminated by shutting in the production well, whenever the water-to-oil ratio becomes excessive, for example about 30:1, as determined in accordance with conventional practice. Whereas in the past it may have been assumed that each quadrant should be equally depleted at the termination of a flood, it now appears that this has not been a sound theory.

What is claimed is:
1. In a method for the secondary recovery of petroleum from sub-surface reservoirs wherein a displacing fluid is injected simultaneously into a plurality of input wells, and wherein displaced reservoir oil is produced from a plurality of production wells spaced among said input wells, the improvement which comprises controlling the injection flow at each of said input wells to maintain a substantially constant volumetric rate of fluid entry into each fraction of each well pattern, proportional to the product of the average permeability and the pore volume of that fraction of the well pattern.

2. A method as defined by claim 1 wherein the flood medium has a mobility greater than that of the reservoir oil.

3. In a method for the secondary recovery of petroleum from a sub-surface reservoir wherein a five-spot pattern of well spacing is employed, wherein a flood medium is injected in the corner wells of each five-spot, and wherein displaced oil is recovered from the center well of each five-spot, the improvement which comprises injecting said flood medium into each quadrant at a constant volumetric rate, proportional to the product of the average permeability and the pore volume of each quadrant of each five-spot in the reservoir.

4. A method as defined by claim 3 wherein the flood medium has a mobility greater than the reservoir oil.

References Cited

UNITED STATES PATENTS 3,199,587   8/1965   Santourian _____ 166—9

OTHER REFERENCES

Muskat, Physical Principles of Oil Production, 1949, pp. 766–771.

CHARLES E. O'CONNELL, *Primary Examiner.*

JAMES A. LEPPINK, *Examiner.*